United States Patent
Ariyavisitakul et al.

(10) Patent No.: US 6,909,759 B2
(45) Date of Patent: Jun. 21, 2005

(54) WIRELESS RECEIVER USING NOISE LEVELS FOR POSTSCALING AN EQUALIZED SIGNAL HAVING TEMPORAL DIVERSITY

(75) Inventors: Sirikiat Lek Ariyavisitakul, Alpharetta, GA (US); Manoneet Singh, Sunnyvale, CA (US)

(73) Assignee: Texas Instruments Incorporated, Dallas, TX (US)

(*) Notice: Subject to any disclaimer, the term of this patent is extended or adjusted under 35 U.S.C. 154(b) by 124 days.

(21) Appl. No.: 10/325,988

(22) Filed: Dec. 19, 2002

(65) Prior Publication Data

US 2004/0125898 A1 Jul. 1, 2004

(51) Int. Cl.$^7$ .............................................. H04B 7/10
(52) U.S. Cl. ...................... 375/347; 375/232; 375/267; 375/357; 370/329; 370/335; 370/535; 367/134; 455/276; 455/277
(58) Field of Search ................................ 375/347, 232, 375/267, 357; 367/134; 370/329, 335, 535; 455/276, 277; 376/134

(56) References Cited

U.S. PATENT DOCUMENTS

| | | | |
|---|---|---|---|
| 5,202,903 A | * | 4/1993 | Okanoue .................... 375/347 |
| 5,559,757 A | * | 9/1996 | Catipovic et al. ........... 367/134 |
| 5,657,401 A | | 8/1997 | De Haan et al. ............ 382/275 |
| 5,666,429 A | | 9/1997 | Urbanski .................... 381/94.1 |
| 5,697,083 A | * | 12/1997 | Sano ........................ 455/276.1 |
| 5,710,995 A | * | 1/1998 | Akaiwa et al. .......... 455/277.2 |
| 6,032,114 A | | 2/2000 | Chan .......................... 704/226 |
| 6,130,909 A | | 10/2000 | Anvari et al. ............... 375/232 |
| 6,275,485 B1 | | 8/2001 | Padovani .................... 370/342 |

OTHER PUBLICATIONS

Gerhard Bauch and Volker Franz, "A Comparison of Soft-In/Soft-Out Algorithms for 'Turbo–Detection'" Proceedings of the International Conference on Telecommunications, ICT–98, pp. 259–263, Jun., 1998.

Gordon L. Stüber "Principles of Mobile Communication, Second Edition", pp. 329–335, published by Kluwer Academic Publishers of Norwell, Massachusetts in 2001.

Global System for Mobile communications (GSM), 3GPP TS 05.02 V8.10.0 (Aug. 2001) 3rd Generation Partnership Project; Technical Specification Group GSM/EDGE Radio Access Network; Multiplexing and multiple access on the radio path (Release 1999) pp. 17–20, published in Valbonne, France.

* cited by examiner

*Primary Examiner*—Shuwang Liu
*Assistant Examiner*—Eva Zheng
(74) *Attorney, Agent, or Firm*—Abdul Zindani; W. James Brady, III; Frederick J. Telecky, Jr.

(57) ABSTRACT

A wireless receiver for receiving an incoming signal having spatial and temporal diversity. The receiver uses noise-based prescaling of multiple receiver chain signals for optimally combining the receiver chain signals in a composite equalized signal and uses noise-based time-varying postscaling the equalized signal. The receiver determines noise-based scale factors by comparing signal symbols to dispersed replica symbols of a training sequence for the incoming signal.

28 Claims, 7 Drawing Sheets

WIRELESS RECEIVER USING NOISE LEVELS FOR POSTSCALING AN EQUALIZED SIGNAL HAVING TEMPORAL DIVERSITY

BACKGROUND OF THE INVENTION

1. Field of the Invention

The invention relates generally to diversity and more particularly to wireless receivers using noise levels for combining multiple signals, using noise levels for dynamic scaling of an equalized signal, and having a method for determining noise levels.

2. Description of the Prior Art

There is an escalating demand for wireless systems such as cellular telephones and wireless local area networks (LAN)s. This demand and economic factors are driving requirements for ever higher data throughput and greater range for these systems. However, as data rate and range is increased the wireless signals in these systems are increasingly degraded by burst noise and by time-varying frequency selective attenuation (fading) and delay distortion. This fading and distortion, generally caused by having multiple signal paths or channels between a transmitter and receiver, is known as multipath fading or multipath distortion or simply multipath.

A technique called equalization is commonly used for compensating for the effects of the multipath in order to estimate the bits that were actually transmitted. Most modem systems also use error detection and correction encoding where the transmitter encodes the bits that are transmitted with extra information that enables the receiver to use a decoding algorithm to detect and correct errors in the received bits after equalization.

Recent systems have improved upon standard or hard bit decision equalization with soft equalization where probabilities of transmitted bits are estimated. Where soft equalization is used, the receiver decoding algorithm operates on the probabilities of the equalized transmitted bits for error detection and correction.

In addition to equalization and encoding, wireless systems sometimes use other techniques, such as temporal diversity and spatial diversity, for combating burst noise and multipath. For temporal diversity, transmitted bits are interleaved into time-separated packets at a transmitter, spreading and thereby reducing the effect of burst noise or multipath fading in particular packets. The interleaved bits are then deinterleaved at the receiver to recreate their original order. However, in known systems where soft equalization is used, the reliability of the error detection and correction decoding process in the receiver is limited by changes in noise and multipath during the time separation.

Multiple antennas are used for spatial diversity for transmitting or receiving the wireless signals. Because the multiple antennas have different spatial locations, the signal paths are different and therefore the multipath is different. The multiple signals are combined at the receiver. A wireless receiver can use the idea that the multipath is different in the different signal paths in order to reduce the degradation that the multipath causes. Several combining methods, such as maximal ratio combining and equal gain combining are known in the prior art. However, none of the known methods combine the signals in an optimum way in the presence of equalization.

There remains a need for improved methods using spatial diversity and temporal diversity with equalization for reducing multipath effects.

SUMMARY OF THE INVENTION

It is therefore an object of the present invention to provide a spatial diversity receiver and method where multiple signals are weighted and combined according to their noise levels for providing an optimal composite equalized signal.

Another object of the present invention is to provide a temporal diversity receiver and method using noise scaling of a soft equalized signal before the signal is deinterleaved.

Another object of the present invention is to provide a simple apparatus and convenient method for determining a representation of signal noise level.

Briefly, a method and a receiver of the present invention determines ratios of noise levels of received signals and then uses the noise level ratios for determining noise-based scale factors. For spatial diversity, the noise-based scale factors are used for weighting multiple received signals inversely according to their respective noise levels for providing a composite equalized signal. For temporal diversity, the noise-based scale factors are used for dynamically scaling an equalized signal in order to compensate for time variations in noise and multipath. For temporal diversity and spatial diversity used together, the equalized signal that is scaled is the composite equalized signal.

In a preferred embodiment, for spatial diversity a receiver of the present invention includes multiple receiver chains and a noise-based spatial diversity combiner. For temporal diversity a receiver of the present invention includes a noise postscaler. For combined spatial and temporal diversity, the receiver includes the multiple receiver chains, the spatial diversity combiner, and the noise postscaler.

For spatial diversity, the receiver chains receive an incoming signal and provide sampled receiver chain signals to the spatial diversity combiner. The spatial diversity combiner scales and equalizes the sampled receiver chain signals by computing a set of composite equalizer branch metrics $t_n(s \rightarrow s')$ as shown in an equation 1 and then uses the composite equalizer branch metrics $t_n(s \rightarrow s')$ for providing a composite equalized signal $u_i$ as shown in an equation 2.

$$t_n(s \rightarrow s') = \frac{1}{p_a^2}\left|r_{n,a} - h_{o,a}x_n(s \rightarrow s') - \sum_{k=1}^{K} h_{k,a}x_{n-k}(s)\right|^2 + \quad (1)$$

$$\frac{1}{p_b^2}\left|r_{n,b} - h_{o,b}x_n(s \rightarrow s') - \sum_{k=1}^{K} h_{k,b}x_{n-k}(s)\right|^2 \cdots +$$

$$\frac{1}{p_m^2}\left|r_{n,m} - h_{o,m}x_n(s \rightarrow s') - \sum_{k=1}^{K} h_{k,m}x_{n-k}(s)\right|^2$$

$$u_i = F(\{\{t_n(s \rightarrow s')\}, s, s'\}_{n=0}^{N-1}) \quad (2)$$

In the equation 1, the n is the time index of the received symbols, the $r_{n,a}$, $r_{n,b}$ through $r_{n,m}$ represent nth symbols received in receiver chains denoted "a", "b" through "m", respectively; the $h_{k,a}$, $h_{k,b}$ through $h_{k,m}$ represent kth of 0 to K coefficients of channel impulse response sets for the "a", "b" through "m" receiver chains, respectively; the $x_n(s \rightarrow s')$ represents a symbol uniquely determined by an equalizer transition from an originating state s to a new state s' for the nth symbol; the $x_{n-k}(s)$ represents symbols uniquely determined by the state s for the nth symbol and the kth of said of 1 to K coefficients; the $p_a^2$, $p_b^2$ through $p_m^2$ are quantities that represent the noise variances in the "a", "b" through "m" receiver chains, respectively; and the $t_n(s \rightarrow s')$ represents composite equalizer branch metrics corresponding to the equalizer transitions for the nth received symbols. The K most recent symbols $\{x_{n-k}(s)\}_{k=1}^{K}$ are uniquely determined by the originating state s. The $1/p_a$, $1/p_b$ through $1/p_m$ or their squares are noise-based scale factors.

There are $S=P^{K+1}$ state s to state s' equalizer transitions for each index n where "P" is the number of modulation states in the transmitted signal and "K+1" is the length or number of coefficients in the channel impulse response. For example for BPSK, "P" is two. For a P of two and a K of five, the number S of equalizer branch metrics $t_n(s \to s')$ is 64 for each index n.

In the equation 2, the composite equalized signal $u_i$ is the ith index for a function of all equalizer branch metrics. The composite equalized signal $u_i$ has the form of a sample stream of bit probabilities for the i=0 . . . (N−1)th received symbol where N is the total number of received symbols over which the equalizer operates. This is the "soft" information that feeds an error correcting decoder.

The present invention can be implemented by noise scaling each of the composite equalizer branch metrics $t_n(s \to s')$ as shown in equation 1, as it is being computed within an equalizer. However, this would require several multiplications per index n, the number of multiplications dependent on the total number of state transitions within the equalizer trellis (64 in the example above). In a preferred embodiment, the spatial diversity combiner therefore includes noise prescalers for prescaling the receiver chain signals $r_{n,a}$, $r_{n,b}$ through $r_{n,m}$ and channel impulse response sets $h_{k,a}$, $h_{k,b}$ through $h_{k,m}$ according to equations 3A–C and 4A–C.

$$\tilde{r}_{n,a} = \left(\frac{p_{\min}}{p_a}\right) r_{n,a} \quad (3A)$$

$$\tilde{r}_{n,b} = \left(\frac{p_{\min}}{p_b}\right) r_{n,b} \quad (3B)$$

$$\tilde{r}_{n,m} = \left(\frac{p_{\min}}{p_m}\right) r_{n,m} \quad (3C)$$

$$\tilde{h}_{k,a} = \left(\frac{p_{\min}}{p_a}\right) h_{k,a} \quad (4A)$$

$$\tilde{h}_{k,b} = \left(\frac{p_{\min}}{p_b}\right) h_{k,b} \quad (4B)$$

$$\tilde{h}_{k,m} = \left(\frac{p_{\min}}{p_m}\right) h_{k,m} \quad (4C)$$

In the equations 3A–C and 4A–C, the $p_{min}=\min(p_a, p_b \ldots p_m)$ where $p_{min}$ is the smallest of the $p_a$ and $p_b$ through $p_m$; the $\tilde{r}_{n,a}$, $\tilde{r}_{n,b}$ through $\tilde{r}_{n,m}$ represent prescaled receiver chain signals; and the $\tilde{h}_{k,a}$, $\tilde{h}_{k,b}$ through $\tilde{h}_{k,m}$ represent the prescaled channel impulse response sets. The $p_{min}/p_a$, $p_{min}/p_b$ through $p_{min}/p_m$ are noise-based scale factors. An equation 5 shows composite equalizer branch metrics $\tilde{t}_n(s \to s')$ determined from the prescaled receiver chain signals $\tilde{r}_{n,a}$, $\tilde{r}_{n,b}$ through $\tilde{r}_{n,m}$ and the prescaled channel impulse response sets $\tilde{h}_{k,a}$, $\tilde{h}_{k,b}$ through $\tilde{h}_{k,m}$.

$$\tilde{t}_n(s \to s') = \left| \tilde{r}_{n,a} - \tilde{h}_{o,a} x_n(s \to s') - \sum_{k=1}^{K} \tilde{h}_{k,a} x_{n-k}(s) \right|^2 + \quad (5)$$

$$\left| \tilde{r}_{n,b} - \tilde{h}_{o,b} x_n(s \to s') - \sum_{k=1}^{K} \tilde{h}_{k,b} x_{n-k}(s) \right|^2 \cdots +$$

$$\left| \tilde{r}_{n,m} - \tilde{h}_{o,m} x_n(s \to s') - \sum_{k=1}^{K} \tilde{h}_{k,m} x_{n-k}(s) \right|^2$$

Because it is the ratio of the scale factors and not their actual values that is necessary for the optimal combining of the receiver chain signals, the $p_{min}$ in the numerator of the scale factors can be replaced by an arbitrary constant. However, an advantage of the use of the $p_{min}$ is that the signal level after automatic gain control (AGC) of the dominant receiver chain signal is retained while the signal levels of the other receiver chains are lowered, thereby retaining the use of the dynamic range of the equalizer. An equation 6 shows a composite equalized signal $\tilde{u}_i$ of a sample stream of bit probabilities that is analogous to the composite equalized signal $u_i$ of the equation 2.

$$\tilde{u}_i = F(\{\{\tilde{t}_n(s \to s')\}, s, s'\}_{n=0}^{N-1}) \quad (6)$$

In a system using temporal diversity, the noise postscaler dynamically scales packets of the composite equalized signal $\tilde{u}_i$ by $1/p_{min}^2$ in order to eliminate the effect of packet-to-packet changes in noise level.

It should be noted that the composite equalizer branch metrics $\tilde{t}_n(s \to s')$ scaled by $1/p_{min}^2$ are equal to the composite equalizer branch metrics $t_n(s \to s')$ shown in the equation 1 and that the composite equalized signal $\tilde{u}_i$ times $1/p_{min}^2$ is the composite equalized signal $u_i$. However, the prescaling and postscaling of the present invention have substantially reduced the number of multiplications that are required.

For an alternative embodiment the equation 1 may be reformatted as shown in an equation 7.

$$\tilde{t}_n''(s \to s') = \quad (7)$$

$$\frac{1}{p_a^2 p_b^2 \cdots p_m^2} \text{product } (p_a^2) \left| r_{n,a} - h_{o,a} x_n(s \to s') - \sum_{k=1}^{K} h_{k,a} x_{n-k}(s) \right|^2 +$$

$$\frac{1}{p_a^2 p_b^2 \cdots p_m^2} \text{product } (p_b^2)$$

$$\left| r_{n,b} - h_{o,b} x_n(s \to s') - \sum_{k=1}^{K} h_{k,b} x_{n-k}(s) \right|^2 \cdots +$$

$$\frac{1}{p_a^2 p_b^2 \cdots p_m^2} \text{product } (p_m^2) \left| r_{n,m} - h_{o,m} x_n(s \to s') - \sum_{k=1}^{K} h_{k,m} x_{n-k}(s) \right|^2$$

In the equation 7 the product$(p_{\overline{a}}^2)$ is the product of all the noise representations $p_a^2$, $p_b^2$ through $p_m^2$ except the noise representation $p_a^2$; the product$(p_{\overline{b}}^2)$ is the product of all the noise representations $p_a^2$, $p_b^2$ through $p_m^2$ except the noise representation $p_b^2$; the product$(p_{\overline{m}}^2)$ is the product of all the noise representations $p_a^2$, $p_b^2$ through $p_m^2$, except the noise representation $p_m^2$; and the $t_n''(s \to s')$ represents the equalizer branch metrics corresponding to the trellis transition from state s to state s', for the nth index. The product$(p_{\overline{a}}^2)/p_a p_b \ldots p_m$, product$(p_{\overline{b}}^2)/p_a p_b \ldots p_m$ through product$(p_{\overline{m}}^2)/p_a p_b \ldots p_m$ or their squares are noise-based scale factors. For only two receiver chains "a" and "b", the product$(p_{\overline{a}}^2)$ is $p_b^2$ and the product$(p_{\overline{b}}^2)$ is $p_a^2$. For this alternative embodiment, the spatial diversity combiner includes noise prescalers for implementing equations 8A–C, 9A–C and 10 for determining composite equalizer branch metrics $t_n''(s \to s')$ for the spatial diversity combiner with the prescaling for the receiver chains "a", "b" through "m".

$$\tilde{r}''_{n,a} = \text{product}(p_{\overline{a}}/p_{max})r_{n,a} \qquad (8A)$$

$$\tilde{r}''_{n,b} = \text{product}(p_{\overline{b}}/p_{max})r_{n,b} \qquad (8B)$$

$$\tilde{r}''_{n,m} = \text{product}(p_{\overline{m}}/p_{max})r_{n,m} \qquad (8C)$$

$$\tilde{h}''_{k,a} = \text{product}(p_{\overline{a}}/p_{max})h_{k,a} \qquad (9A)$$

$$\tilde{h}''_{k,b} = \text{product}(p_{\overline{b}}/p_{max})h_{k,b} \qquad (9B)$$

$$\tilde{h}''_{k,m} = \text{product}(p_{\overline{m}}/p_{max})h_{k,m} \qquad (9C)$$

$$\tilde{t}''_n(s \to s') = \left| \tilde{r}''_{n,a} - \tilde{h}''_{o,a}x_n(s \to s') - \sum_{k=1}^{K} \tilde{h}''_{k,a}x_{n-k}(s) \right|^2 + \\ \left| \tilde{r}''_{n,b} - \tilde{h}''_{o,b}x_n(s \to s') - \sum_{k=1}^{K} \tilde{h}''_{k,b}x_{n-k}(s) \right|^2 \cdots + \\ \left| \tilde{r}''_{n,m} - \tilde{h}''_{o,m}x_n(s \to s') - \sum_{k=1}^{K} \tilde{h}''_{k,m}x_{n-k}(s) \right|^2 \qquad (10)$$

In the equations 8A–C and 9A–C, the $p_{max}=\max(p_a, p_b \ldots p_m)$ where $p_{max}$ is the largest of the noise representations $p_a$ and $p_b$ through $p_m$; the $\tilde{r}''_{n,a}$, $\tilde{r}''_{n,b}$ through $\tilde{r}''_{n,m}$ represent prescaled receiver chain signals; the $\tilde{h}''_{k,a}$, $\tilde{h}''_{k,b}$ through $\tilde{h}''_{k,m}$ represent the prescaled channel impulse response sets; and the $\tilde{t}''_n(s \to s')$ represents composite equalizer branch metrics for the receiver chain signals $\tilde{r}''_{n,a}$, $\tilde{r}''_{n,b}$ through $\tilde{r}''_{n,m}$ and the channel impulse response sets $\tilde{h}''_{k,a}$, $\tilde{h}''_{k,b}$ through $\tilde{h}''_{k,m}$. The product($p_{\overline{a}}/p_{max}$) is the product of the noise representations for all the receiver chains except the receiver chain "a" divided by the largest noise representation, the product($p_{\overline{b}}/p_{max}$) is the product of the noise representations for all the receiver chains except for the receiver chain "b" divided by the largest noise representation, product($p_{\overline{m}}/p_{max}$) is the product of the noise representations for all the receiver chains except for the receiver chain "m" divided by the largest noise representation. The product($p_{\overline{a}}/p_{max}$), product($p_{\overline{b}}/p_{max}$) through product($p_{\overline{m}}/p_{max}$) are noise-based the scale factors. For only two receiver chains "a" and "b", the product($p_{\overline{a}}/p_{max}$) is $p_b/p_{max}$ and the product($p_{\overline{b}}/p_{max}$) is $p_a/p_{max}$. For three receiver chains "a", "b" and "c", the product($p_{\overline{a}}/p_{max}$) is $p_b p_c/p_{max}^2$ the product($p_{\overline{b}}/p_{max}$) is $p_a p_c/p_{max}^2$ and the product($p_{\overline{c}}/p_{max}$) is $p_a p_b/p_{max}^2$. Because it is the ratio of the scale factors and not their actual values that is necessary for the optimal combining the receiver chains, the $p_{max}$ in the denominator of the scale factors may be replaced by an arbitrary constant. However, an advantage of the use of the $p_{max}$ is that the signal level after automatic gain control (AGC) of the dominant receiver chain signal is retained while the signal levels of the other receiver chains are lowered, thereby retaining the use of the dynamic range of the equalizer.

In a system using temporal diversity, the noise postscaler in the alternative embodiment scales the composite equalizer branch metrics $\tilde{t}''_n(s \to s')$ by a postscale factor of $p_{max}^{2(M-1)}/p_a^2 p_b^2 \ldots p_m^2$ in order to eliminate packet to packet changes in noise level where the M is the total number of receiver chains and the $p_a^2 p_b^2 \ldots p_m^2$ is the product of the quantities that represent the noise variances of all the receiver chains "a", "b" through "m". For only two receiver chains "a" and "b" the postscale factor is $p_{max}^2/p_a^2 p_b^2$. It should be noted that the composite equalizer branch metrics $\tilde{t}''_n(s \to s')$ scaled by $p_{max}^2/p_a^2 p_b^2$ are equal to the composite equalizer branch metrics $t_n(s \to s')$ shown in the equation 1. Hence the two systems provide the same results.

In a system using spatial diversity but not temporal diversity, the postscaler is not required. In a system using temporal diversity but not spatial diversity, only one receiver chain, denoted by "a", is needed and the spatial diversity combiner is an equalizer for equalizing the receiver chain signal $r_{n,a}$ with the channel impulse response set $h_{k,a}$ without the need for noise-based prescaling. For a receiver with only the single receiver chain "a", the postscaler uses a scale factor of $1/p_a^2$ for scaling the equalized signal in each data packet.

The true noise variances for the receiver chain signals $r_{n,a}$, $r_{n,b}$ through $r_{n,m}$ can be computed and used for the quantities $p_a^2$, $p_b^2$ through $p_m^2$, respectively. However, the calculation of such noise variances requires the computationally intensive operations of squaring real and imaginary noise components and then taking a square root of the squared real and imaginary components to compute the prescale factors required for the equations in 3A–C and 4A–C or 8A–C and 9A–C. The noise estimators of the present invention avoid the squaring and square root operations by using real and imaginary cyclic finite impulse response (FIR) filters for determining real and imaginary noises by comparing the symbols of the receiver chain signals $r_{n,a}$, $r_{n,b}$ through $r_{n,m}$ to a known preamble as dispersed according to the calculated channel impulse response coefficients. The noise estimators then simply add the real and imaginary noises for determining the noise representations $p_a$, $p_b$ through $p_m$. An equation 11 shows the determination of the noise representation $p_a$ for the receiver chain "a". The noise representations $p_b$ through $p_m$ are calculated in an identical manner for a receiver having multiple receiver chains "b" through "m".

$$p_a = \left\langle \left| \text{Re}\left\{ r_{n+\zeta,a} - \sum_{k=0}^{K} h_{k,a} w_{n-k} \right\} \right| \right\rangle + \left\langle \left| \text{Im}\left\{ r_{n+\zeta,a} - \sum_{k=0}^{K} h_{k,a} w_{n-k} \right\} \right| \right\rangle \qquad (11)$$

In the equation 11, the $w_{n-k}$ represents the symbols corresponding to a known training sequence in the incoming signal, the $\zeta$ is the time index offset of the first received symbol corresponding to the training sequence received in the receiver chain "a", and the outer brackets "< >" denote averaging. It should be noted that the method of the present invention takes advantage of the fact that the noise on the incoming signal is approximately uncorrelated between real and imaginary and both the real and imaginary noises have approximately a Gaussian distribution.

In a preferred embodiment for a Global System for Mobile Communication (GSM) system, the cyclic FIR filters take advantage of the fact that a 26 bit preamble includes a pre-pended 5 bits that duplicate the last 5 bits of a 16 bit mid-section and a post-pended 5 bits that duplicate the first 5 bits of the 16 bits of the mid-section for operating in a circular manner.

These and other objects and advantages of the present invention will no doubt become obvious to those of ordinary skill in the art after having read this summary and the following detailed description of the preferred embodiments which are illustrated in the various figures.

IN THE DRAWINGS

DETAILED DESCRIPTION OF THE PREFERRED EMBODIMENTS

Figure 1:
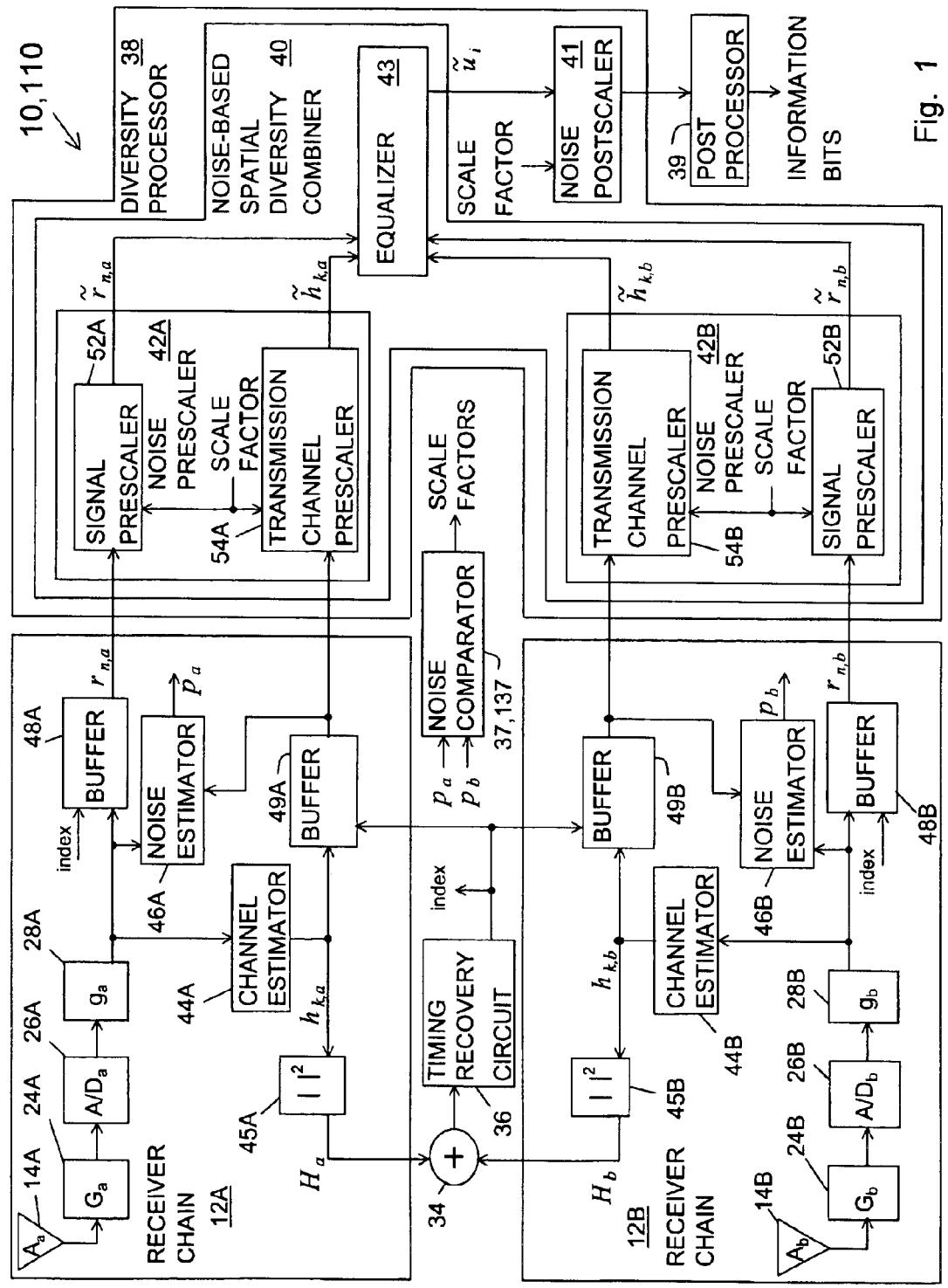
FIG. 1 is a block diagram of a receiver of the present invention for determining a noise representation and then using the noise representation for combining signals having temporal and spatial diversity.

FIG. 1 is a block diagram of a preferred embodiment of a receiver of the present invention referred to by a general reference number 10. The receiver 10 includes a receiver chain 12A for processing signals received in an antenna $A_a$, denoted by 14A, and a receiver chain 12B for processing signals received by an antenna $A_b$, denoted by 14B. Although the receiver 10 is illustrated and described for two channels, the idea may extended to any number of channels.

The receiver chain 12A includes analog circuits $G_a$, denoted by 24A; an analog-to-digital converter $A/D_a$, denoted by 26A; and digital circuits $g_a$; denoted by 28A. Similarly, the receiver chain 12B includes analog circuits $G_b$, denoted by 24B; an analog-to-digital converter $A/D_b$, denoted by 26B; and digital circuits $g_b$, denoted by 28B. The antennas $A_a$ 14A and $A_b$ 14B convert incoming radio frequency (RF) signals from an airwave to a conducted form. The analog circuits $G_a$ 24A and $G_b$ 24B filter, amplify, and downconvert the conducted RF signals to a lower frequency. The analog circuits $G_a$ 24A and $G_b$ 24B also provide automatic gain control (AGC) for the signals. The $A/D_a$ 26A and $A/D_b$ 26B convert the lower frequency signals from an analog form to a digital form. The digital circuits $g_a$ 28A and $g_b$ 28B apply further filtering, amplification, frequency conversion, and AGC to the digitized signals and issue sampled receiver chain signals $r_{n,a}$ and $r_{n,b}$ where n is the index of the nth signal symbols received in the receiver chains 12A and 12B, respectively. The antenna $A_a$ 14A has a different spatial location than the antenna $A_b$ 14B, thereby providing spatial diversity.

Figure 2:
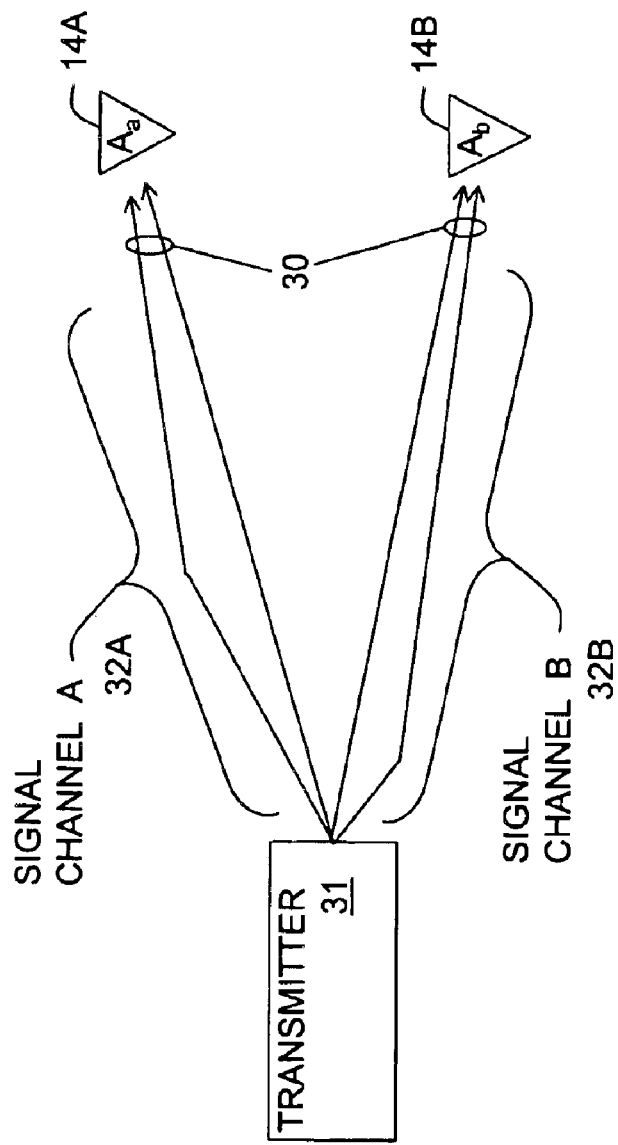
FIG. 2 is a diagram of a system showing multiple signals channels with multiple antennas in the receiver of the present invention.

Referring to FIG. 2, the receiver 10 receives a signal 30 from a transmitter 31 through a signal transmission channel A, denoted by 32A; and a signal transmission channel B, denoted by 32B, to antennas $A_a$ 14A and $A_b$ 14B, respectively. Because antennas $A_a$ 14A and $A_b$ 14B are physically separated, the signal transmission channels A 32A and B 32B are different and in general have different multipath. For temporal diversity, the transmitter 31 interleaves information bits into time-separated packets according to a system specification. The transmitter 31 also encodes and frames the information bits with an error detection/correction algorithm into packets. The encoded interleaved framed packets of transmitted bits are carried on the signal 30.

Returning to FIG. 1, the receiver 10 also includes a summer 34, a timing recovery circuit 36, a noise comparator 37, a diversity processor 38, and a postprocessor 39. The diversity processor 38 weights, combines and equalizes the receiver chain signals $r_{n,a}$ and $r_{n,b}$ by determining effective equalizer branch metrics according to the equation 1 or the equation 10.

The diversity processor 38 preferably includes a noise-based spatial diversity combiner 40 and a noise postscaler 41. The spatial diversity combiner 40 includes a noise prescaler 42A, a noise prescaler 42B, and an equalizer 43.

The noise prescaler 42A can also be considered a part of the receiver chain 12A and similarly the noise prescaler 42B can be considered a part of the receiver chain 12B.

The receiver chain 12A also includes a channel estimator 44A, a squarer 45A, a noise estimator 46A, and buffers 48A and 49A. Similarly, the receiver chain 12B includes a channel estimator 44B, a squarer 45B, a noise estimator 46B, and buffers 48B and 49B. For the purpose of the present invention, there is no significant difference whether the analog circuits $G_a, G_b$ 24A,B, the analog-to-digital converters $A/D_a, A/D_b$ 26A,B, the digital circuits $g_a, g_b$ 28A,B, and the channel estimators 44A,B, the squarers 45A,B, and the noise estimators 46A,B are constructed separately for the receiver chains 12A,12B; or are constructed so as to span the receiver chains A,B 12A,12B.

The noise estimator 46A determines a representation $p_a$ of the noise variance for the noise, including signal interference, for the receiver chain signal from the digital circuit $g_a$ 28A and passes the noise representation $p_a$ to the noise comparator 37. Similarly, the noise estimator 46B determines a representation $p_b$ of the noise variance for the noise, including signal interference, for the receiver chain signal from the digital circuit $g_b$ 28B and passes the noise representation $p_b$ to the noise comparator 37. It is not necessary that the noise representations $p_a$ and $p_b$ be actual noise variances but only that they each have a relationship or ratio that can be directly to the actual noise variance ratio. The noise comparator 37 determines the smallest of the noise representations $p_a$ and $p_b$ as a minimum noise representation $p_{min}$, and then computes a noise-based scale factor $p_{min}/p_a$ for the receiver chain 12A and a noise-based scale factor $p_{min}/p_b$ for the receiver chain 12B.

The channel estimators 44A and 44B use a training sequence embedded in the frames of the receiver chain signals from the digital circuits $g_a$ 28A and $g_b$ 28B, respectively, for estimating channel impulse response sets $h_{k,a}$ and $h_{k,b}$, respectively. The squarers 45A and 45B square absolute values of the channel impulse responses $h_{k,a}$ and $h_{k,b}$ and issue squared outputs $H_a$ and $H_b$ to the summer 34. The summer 34 adds the squared channel impulse responses $H_a$ and $H_b$ and then issues summed squared channel impulse responses to the timing recovery circuit 36. The timing recovery circuit 36 uses the summed squared channel impulse responses for providing a symbol synchronization index. The buffers 48A and 48B use the symbol synchronization index for buffering the receiver chain signals $r_{n,a}$ and $r_{n,b}$, respectively. The buffers 49A and 49B synchronize the channel impulse response sets $h_{k,a}$ and $h_{k,b}$, respectively.

The noise comparator 37 passes the scale factors $p_{min}/p_a$ and $p_{min}/p_b$ to the noise prescalers 42A and 42B, respectively. The noise prescaler 42A includes a signal prescaler 52A and a transmission channel prescaler 54A. The signal prescaler 52A multiplies the buffered received signal samples $r_{n,a}$ by $p_{min}/p_a$ for providing a prescaled receiver chain signal $\tilde{r}_{n,a}$ as shown in the equation 3A. The transmission channel prescaler 54A multiplies the buffered channel impulse response set $h_{k,a}$ by $p_{min}/p_a$ for providing a prescaled channel impulse response set $\tilde{h}_{k,a}$ as shown in the equation 4A. Similarly, the noise prescaler 42B includes a signal prescaler 52B and a transmission channel prescaler 54B. The signal prescaler 52B multiplies the buffered receiver chain signal $r_{n,b}$ by $p_{min}/p_b$ for providing a prescaled receiver chain signal $\tilde{r}_{n,b}$ as shown in the equation 3B. The transmission channel prescaler 54B multiplies the buffered channel impulse response set $h_{k,b}$ by $p_{min}/p_b$ for providing a prescaled channel impulse response set $\tilde{h}_{k,b}$ as shown in the equation 4B. The noise postscaler 41 uses a scale factor of $1/p^2_{min}$ received from the noise comparator 37 for dynamically scaling the composite equalized signal $\tilde{u}_i$.

Figure 3:
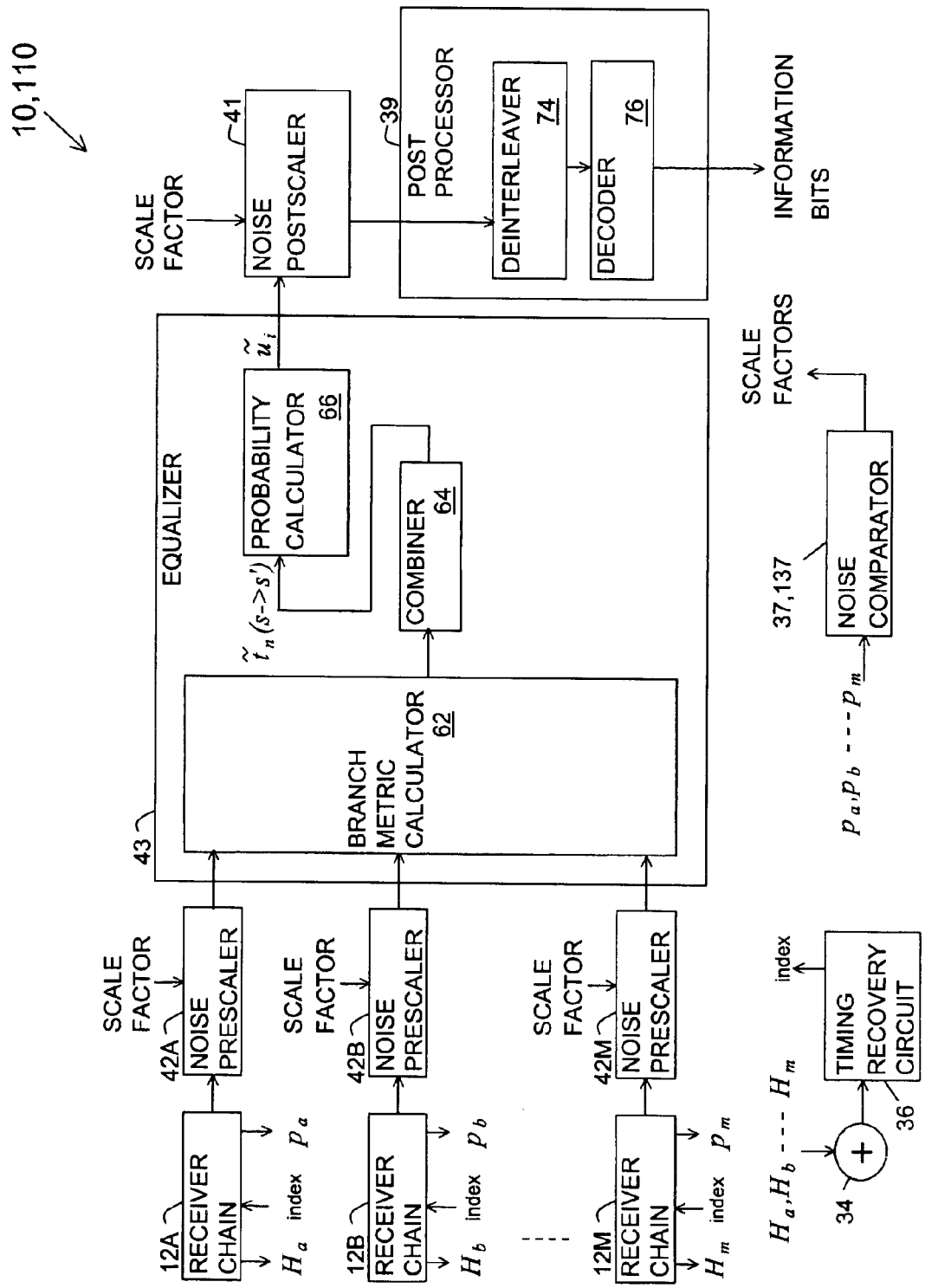
FIG. 3 is another block diagram of the receiver of FIG. 1.

FIG. 3 is a block diagram of the receiver 10 showing the receiver chains 12A and 12B through to a receiver chain 12M for providing signals to the noise prescalers 42A and 42B through to a noise prescaler 42M. The noise prescalers 42A–M pass signals to the equalizer 43 as described above. The receiver chain 12M is similar in all respects to the receiver chains 12A and 12B, and the noise prescaler 42M is similar in all respects to the noise prescalers 42A and 42B, described above. The receiver 10 may have many receiver chains 12A–M for spatial diversity or spatial and temporal diversity, or only one receiver chain 12A for temporal diversity but not spatial diversity. The receiver chains 12A, 12B through 12M provide squared channel impulse responses $H_a$, $H_b$ through $H_m$ to the summer 34 and receive the index from the timing recovery circuit 36. The noise prescalers 42A–M receiver prescale scale factors from the noise comparator 37. The equalizer 43 is preferably a soft equalizer for providing bit probabilities as opposed to a hard equalizer where the actual bits are estimated.

The equalizer 43 includes functional blocks for a branch metric calculator 62, a combiner 64, and a probability calculator 66 preferably implemented together in a digital signal processor (DSP) integrated circuit where the DSP circuit is constructed as a single physical block. Because the DSP circuit is constructed as a single block it may not be possible to separate the functional blocks physically.

The branch metric calculator 62 uses prescaled channel impulse response sets $\tilde{h}_{k,a}$, $\tilde{h}_{k,b}$ through $\tilde{h}_{k,m}$ for equalizing prescaled receiver chain signals $\tilde{r}_{n,a}$, $\tilde{r}_{n,b}$ through $\tilde{r}_{n,m}$ for providing respective noise weighted terms of equalizer branch metrics for the receiver chains 12A, 12B through 12M, respectively. The combiner 64 adds the noise weighted terms for providing the composite equalizer branch metrics $\tilde{t}_n(s \rightarrow s')$ as shown in the equation 5. The probability calculator 66 uses the composite equalizer branch metrics $\tilde{t}_n(s \rightarrow s')$ for providing the composite equalized probability signal $\tilde{u}_i$ as shown in the equation 6. Technical information for determining an equalized probability signal from equalizer branch metrics is shown by Gordon L. Stüber in "Principles of Mobile Communication, Second Edition" published 2001 by Kluwer Academic Publishers on pages 329–335, and by Gerhard Branch and Volker Franz in "A Comparison of Soft-In/Soft-Out Algorithms for "Turbo-Detection" published in the Proceedings of the International Conference on Telecommunications, ICT-98, on pages 259–263 in June, 1998. In a preferred implementation using a DSP integrated circuit the composite branch metrics $\tilde{t}_n(s \rightarrow s')$ are intermediate results that are used in the equalizer 43 but are not necessarily available outside the equalizer 43.

The post processor 39 includes a deinterleaver 74 and a decoder 76. The noise postscaler 41 issues the postscaled composite equalized probability signal to the deinterleaver 74. The deinterleaver 74 reverses the interleaving of the system specification for placing the samples back into the order that they would have had without the interleaving performed by the transmitter 31 and passes a deinterleaved signal to the decoder 76. The decoder 76 uses a decoding algorithm according to a system specification for detecting and correcting errors in the deinterleaved signal in order to recover information bits. The information bits may receive further higher level processing in order to pass information for an application to its intended user.

The receiver 10 has been described in a detailed embodiment using prescale noise-based scale factors of $p_{min}/p_a$, $p_{min}/p_b$ through $p_{min}/p_m$, and a postscale noise-based scale factor of $1/p^2_{min}$ as shown in the equations 3A–C, 4A–C, 5, and 6. In an alternative embodiment, a receiver 110 of the present invention uses prescale noise-based scale factors of product($p_a^2/p_{max}$), product($p_b^2/p_{max}$) through product($p_m^2/p_{max}$), and a postscale noise-based scale factor of $p_{max}^{2(M-1)}/p_a^2 p_b^2 \ldots p_m^2$ as shown in the equations 8A–C, 9A–C and 10.

In the receiver 110 a noise comparator 137 receives the noise representation $p_a$ from the noise estimator 46A, the noise representation $p_b$ from the noise estimator 46B, and determines the largest of the noise representations $p_a$, $p_b$ as a maximum noise $p_{max}$ and then computes the scale factor $p_b/p_{max}$ for the receiver chain 12A and the scale factor as $p_a/p_{max}$ for the receiver chain 12B. The noise comparator 137 passes the scale factor $p_b/p_{max}$ to the noise prescaler 42A, passes the $p_a/p_{max}$ to the noise prescaler 42B, and passes the scale factor $p_{max}^{2(M-1)}/p_a^2 p_b^2 \ldots p_m^2$ to the noise postscaler 41.

For two receiver chains 12A and 12B the noise prescaler 42A uses the scale factor $p_b/p_{max}$ for prescaling the buffered receiver chain signal $r_{n,a}$ for providing a prescaled receiver chain signal $\tilde{r}''_{n,a}$ as shown in the equation 8A and prescaling the buffered channel impulse response set $h_{k,a}$ for providing a prescaled channel impulse response set $\tilde{h}''_{k,a}$ as shown in the equation 9A; similarly, the noise prescaler 42B uses the scale factor $p_a/p_{max}$ for prescaling the buffered receiver chain signal $r_{n,b}$ for providing a prescaled receiver chain signal $\tilde{r}''_{n,b}$ as shown in the equation 8B and prescaling the buffered channel impulse response set $h_{k,b}$ for providing a prescaled channel impulse response set $\tilde{h}''_{k,b}$ as shown in the equation 9B. The branch metric calculator 62 of the equalizer 43 uses the prescaled channel impulse response set $\tilde{h}''_{k,a}$, $\tilde{h}''_{k,b}$ through $\tilde{h}''_{k,m}$ for equalizing the prescaled receiver chain signals $\tilde{r}''_{n,a}$, $\tilde{r}''_{n,b}$ through $\tilde{r}''_{n,m}$ and the combiner 64 adds the terms for issuing values of composite branch metrics as shown in the equation 10. The probability calculator 66 uses the composite equalizer branch metrics $\tilde{t}_n''(s \rightarrow s')$ for providing the composite equalized probability signal $\tilde{u}''_i$ analogous to the composite equalized signal $\tilde{u}_i$ shown in the equation 6.

Figure 4:
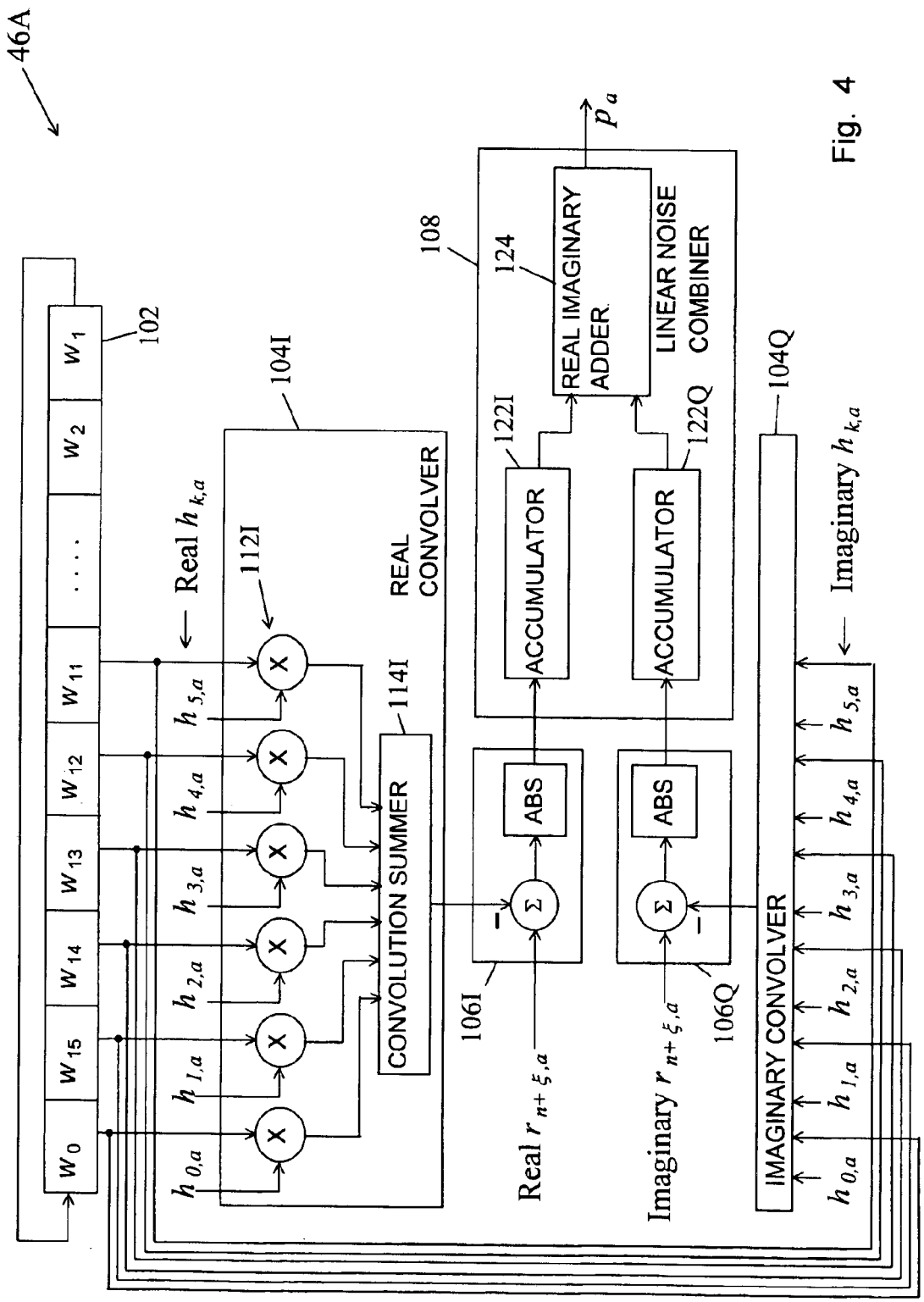
FIG. 4 is a block diagram of a noise estimator of the receiver of FIG. 1.

FIG. 4 is a block diagram of the noise estimator 46A of the present invention for the receiver chain 12A where the receiver 10,110 is a Global Systems for Mobile Communications (GSM) cellphone receiver. The GSM system specifies a 26-symbol training sequence of the form $w_{11}$, $w_{12}$, $w_{13}$, $w_{14}$, $w_{15}$, $w_0$, $w_1$, $w_2$, $w_3$, $w_4$, $w_5$, $w_6$, $w_7$, $w_8$, $w_9$, $w_{10}$, $w_{11}$, $w_{12}$, $w_{13}$, $w_{14}$, $w_{15}$, $w_0$, $w_1$, $w_2$, $w_3$, $w_4$. The noise estimator 46A uses the GSM training sequence in real and imaginary cyclic finite impulse response (FIR) filters for providing the noise representation $p_a$ as shown in the equation 11. Block diagrams for the noise estimator 46B for the receiver chain 12B or for additional noise estimators for additional receiver chains 12B through 12M are the same.

The noise estimator 46A includes a cyclic inter-symbol interference (ISI) sequence generator 102 implemented with shift registers, a convolver implemented with real and imaginary convolvers 104I and 104Q, a comparator implemented with real and imaginary signal comparators 106I and 106Q, and a linear noise combiner 108. The ISI sequence generator 102 shifts and recycles the sixteen central symbols $w_0$ through $w_{15}$ of the 26-symbol GSM training sequence that are known according to the GSM system specification.

The 26-symbol GSM training sequence includes a prepended section of five symbols $w_{11}$ through $w_{15}$ followed by a center section of sixteen symbols $w_0$ through $w_{15}$ followed by five post-pended section of five symbols $w_0$ to $w_4$. The pre-pended five symbol section is a duplicate of the last five symbols ($w_{11}$ to $w_{15}$) of the center sixteen symbol section and the post-pended five symbol section is a duplicate of the first five symbols ($w_0$ to $w_4$) of the center sixteen symbol section. The convolver 104I is shown for an impulse response set of six coefficients $h_{0,a}$ to $h_{5,a}$. Other numbers of coefficients may be used. At the start, the receiver chain signal $r_{n+\zeta,a} = r_{\zeta,a}$ for the index n=0 is synchronized with the $w_0$ as shown at the start of the ISI sequence generator 102.

The convolver 104I includes multipliers 112I and a convolution summer 114I. For the index n=0, the multipliers 112I multiply the first six symbols $w_0$, $w_{15}$ through $w_{11}$ in the generator 102 by the six impulse response coefficients $h_{0,a}$, $h_{1,a}$ through $h_{5,a}$, respectively, for providing six products. The six products are added in the convolution summer 114I and the convolution result of the real n=0 channel dispersed training symbol is passed to the signal comparator 106I. The signal comparator 106I determines a difference between the n=0 channel dispersed training symbol and the receiver chain symbol $r_{\zeta,a}$ and determines the absolute value of the difference as a real symbol noise amplitude for the first training symbol. The real first symbol noise amplitude is passed to the linear noise combiner 108. It should be noted that the real symbol noise amplitude is an absolute value.

This is repeated for the indexes n equal to 1 through 15 while the ISI sequence generator 102 cycles at the same rate, and the results are passed to the linear noise combiner 108. For example, for the next index (n=1) the generator 102 is cycled so that its first symbol is $w_1$, its second symbol is $w_0$, and so on so that its fifteenth symbol is $w_2$. The multipliers 112I multiply the first six symbols $w_1$, $w_0$ through $w_{12}$ in the generator 102 by the six impulse response coefficients $h_{0,a}$, $h_{1,a}$ through $h_{5,a}$, respectively, for providing six new products. The six new products are added in convolution summer 114I and the real n=1 channel dispersed training symbol is passed to the signal comparator 106I. The signal comparator 106I subtracts the n=1 channel dispersed training symbol from the receiver chain symbol $r_{\zeta+1,a}$ and passes the absolute value of the difference as a real second symbol noise amplitude to the linear noise combiner 108.

The linear noise combiner 108 includes real and imaginary accumulators 122I and 122Q and a real imaginary adder 124. The accumulator 122I receives the real symbol noise amplitudes. When the accumulator 122I has accumulated the real symbol noise amplitudes for n from 0 to 15, it passes the accumulated result to the adder 124. The imaginary convolver 104Q, the imaginary signal comparator 106Q, and the imaginary accumulator 122Q operate in an identical manner.

The adder 124 adds the accumulated results from the real and imaginary accumulators 122I and 122Q for providing the noise representation $p_a$ as shown in the equation 11. In an equivalent alternative block diagram, the real and imaginary symbol noise amplitudes are added and then the sum is accumulated for providing the noise representation $p_a$. It should be noted that the averaging shown in the equation 11 is equivalent to adding all the real and imaginary symbol noise absolute amplitudes divided by the number of symbols, sixteen in the above description, that were used in the addition. It should also be noted that the noise representation $p_a$ is determined without any requirement for squaring the real and imaginary noise components or for taking a square root of any combination of real and imaginary noise components.

Figure 5:
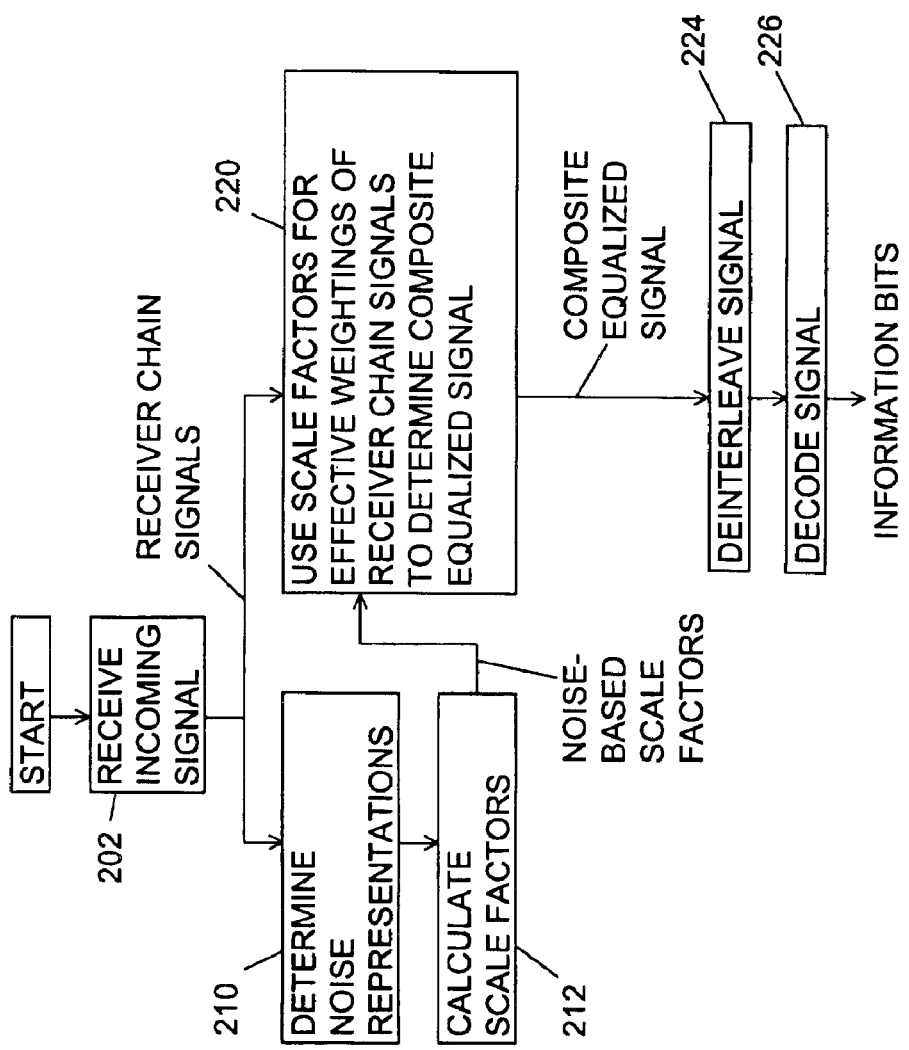
FIG. 5 is a flow chart of a method for determining a noise representation and then using the noise representation for combining signals having temporal and spatial diversity of the receiver of FIG. 1.

FIG. 5 is a flow chart of a method in the receiver 10,110 for diversity processing of the incoming signal 30. In a step 202 the receiver 10,110 receives the signal 30 and provides receiver chain signals. In a step 210 noise representations for noise levels of the receiver chain signals are determined. There is a noise representation for the receiver chain signal for each receiver chain, respectively. In a step 212 the noise-based scale factors for each of the receiver chain signals are calculated from the noise representations. Then, in a step 220 the scale factors are used for effectively weighting equalizer branch metrics that represent the receiver chain signals in order to determine the composite equalized signal. In a step 224, for temporal diversity, the composite equalized signal is deinterleaved. Then, in a step 226 the deinterleaved composite equalized signal is decoded for providing a best estimate of the information bits that were transmitted by the transmitter 31 and carried in the form of coded, interleaved symbols modulated onto the signal 30.

Figure 6:
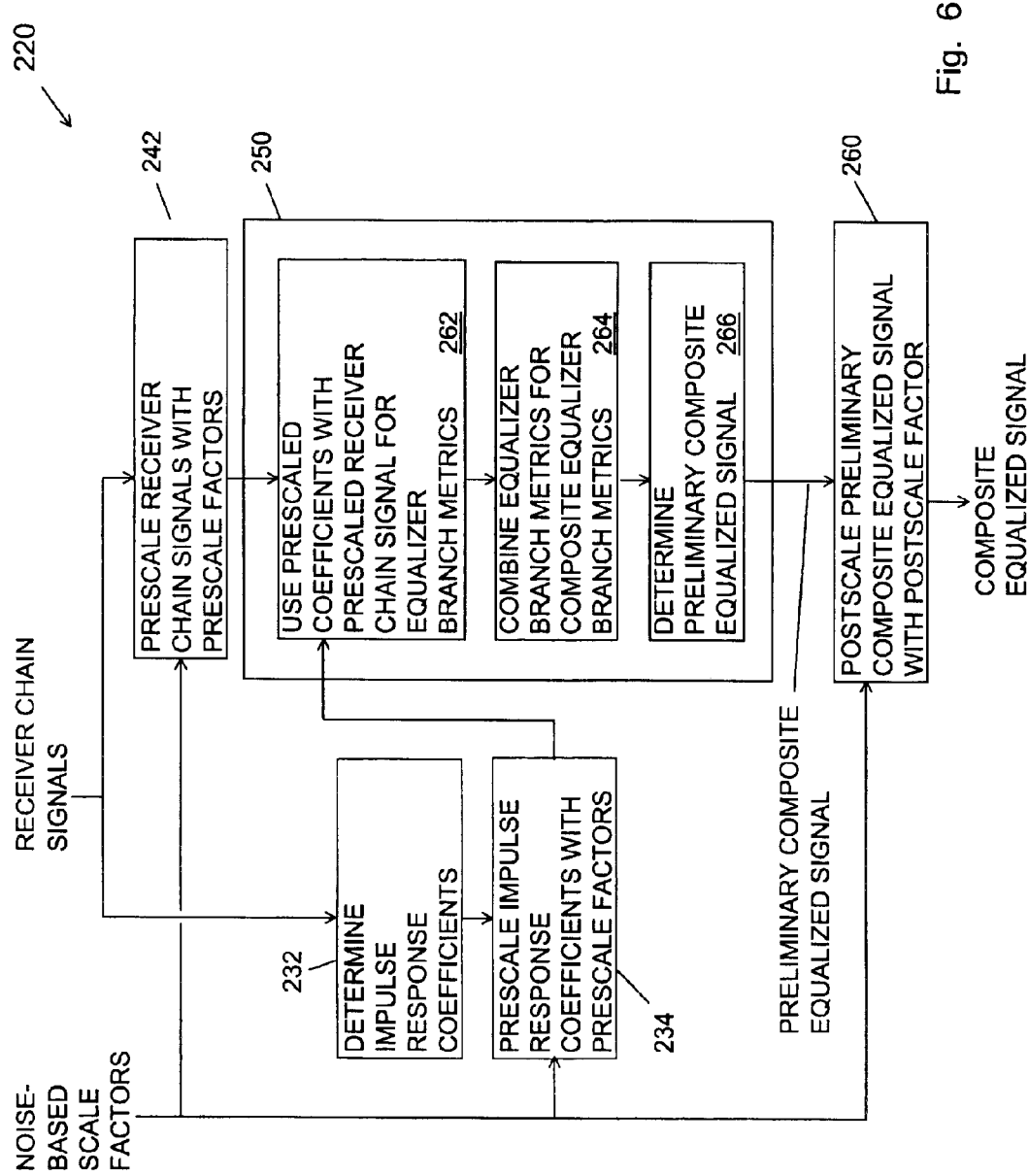
FIG. 6 is a flow chart for combining signals in the method of FIG. 5.

FIG. 6 is a flow chart of a preferred embodiment for the step 220 for determining the composite equalized signal. In a step 232 the channel impulse response coefficients are determined for the receiver chain signal for the receiver chains 12A–M, respectively. There is a set of channel impulse response coefficients for each receiver chain signal, respectively. In a step 234 the channel impulse response coefficients for each of the receiver chain signals are prescaled with the prescale factor for that receiver chain signal. In a step 242 the receiver chain signals are prescaled with the respective prescale factors. In a step 250 the prescaled receiver chain signals are equalized with the prescaled channel impulse response coefficients for determining a composite equalized signal. Where temporal diversity is used, the composite equalized signal is a preliminary composite equalized signal. In a step 260, for temporal diversity the preliminary composite equalizer signal is postscaled with the postscale factor for providing the composite equalizer signal.

The step 250 for equalizing the receiver chain signals functionally includes steps 262, 264, and 266. In the step 262 prescaled equalizer branch metrics are determined from the prescaled receiver chain signals and the prescaled channel impulse response coefficients. In the step 262, for spatial diversity, the prescaled equalizer branch metrics for the receiver chains 12A–M are combined for providing the composite equalizer branch metrics. In the step 266 the composite equalizer branch metrics are processed for determining the composite equalized signal. It should be emphasized that the steps 262–266 are functional operations that may be performed in various ways by digital signal processing techniques where the functions may or may not be physically separable.

Figure 7:
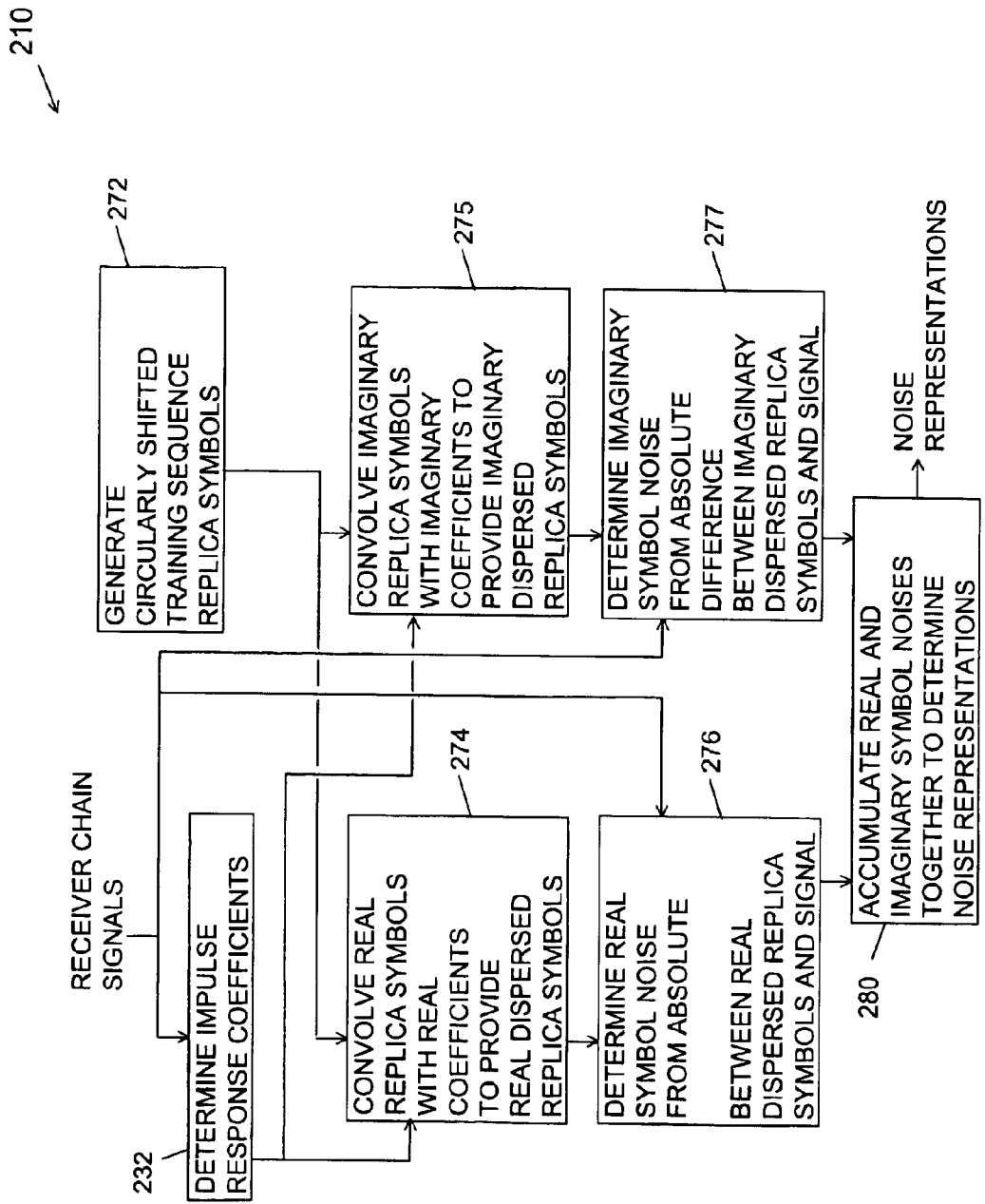
FIG. 7 is a flow chart for determining the noise representation in the method of FIG. 5.

FIG. 7 is a flow chart of a preferred embodiment for the step 210 for determining the noise representations. In the step 232 the channel impulse response coefficients are determined for the receiver chain signals for the receiver chains 12A–M, respectively. In a step 272 a stored replica sequence of predetermined training symbols are continuously shifted and the replica symbols of the shifting sequence are issued in parallel. For the example of GSM the training symbols are shifted in as a circulating cycle. However, the symbols could be shifted in different ways for different system specifications. Real shifting replica symbols are convolved with real channel impulse response coefficients in a step 274; and imaginary shifting replica symbols are convolved with imaginary channel impulse response coefficients in a step 275 for providing real and imaginary channel dispersed replica symbols. In a step 276 real symbols noise amplitudes are determined from the absolute values of the differences between the real dispersed replica symbols and the real symbols in the corresponding receiver chain signals. In a step 277 imaginary symbols noise amplitudes are determined from the absolute values of the differences between the imaginary channel dispersed replica symbols and the imaginary symbols in the corresponding receiver chain signals. Each symbol in a receiver chain signal has an unsigned real noise value and an unsigned imaginary noise. In a step 280 the real and imaginary symbol noise values for a receiver chain signal are accumulated over a certain number of symbols for determining the noise representations for that receiver chain signal.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A receiver for receiving an incoming signal having temporal diversity, comprising:
   at least one noise estimator for determining at least one time-varying noise representation for noise level of said incoming signal, said noise representation used for determining a time-varying postscale factor;
   a soft equalizer for equalizing said incoming signal for providing a soft equalized signal;
   a noise postscaler using said time-varying postscale factor for scaling said equalized signal for providing a noise-scaled equalized signal; and wherein:
   said postscale factor depends inversely on said time-varying noise representation.

2. A receiver for receiving an incoming signal having temporal diversity, comprising:
   at least one noise estimator for determining at least one time-varying noise representation for noise level of said incoming signal, said noise representation used for determining a time-varying postscale factor;
   a soft equalizer for equalizing said incoming signal for providing a soft equalized signal;
   a noise postscaler using said time-varying postacale factor for scaling said equalized signal for providing a noise-scaled equalized signal; and wherein:
   said time-varying postacale factor has levels corresponding to a time periods, respectively, of said incoming signal; and
   the noise postscaler scales said equalized signal corresponding to said time periods by said postacale factor levels corresponding to said time periods for providing said noise-scaled equalized signal.

3. The receiver of 2, wherein:
   said time periods correspond to packets, respectively.

4. The receiver of claim 2, further comprising:
   a deinterleaver for reordering a sequence of bit probabilities in said noise-scaled equalized signal according to a system interleaving specification; and
   a decoder for determining information bits from said reordered bit probabilities according to said system coding specification.

5. A receiver for receiving an incoming signal having temporal diversity, comprising:
   two or more noise estimators for determining two or more time-varying noise representations for noise level of said incoming signal, said noise representations used for determining a time-varying postscale factor;
   a soft equalizer for equalizing said incoming signal for providing a soft equalized signal;
   a noise postscaler using said time-varying postscale factor for scaling said equalized signal for providing a noise-scaled equalized signal;
   two or more receiver chains for receiving said incoming signal and providing two or more receiver chain signals, respectively; the noise estimators using said receiver chain signals, respectively, for determining said noise representations, respectively;
   a noise comparator for determining two or more noise-based scale factors from said noise representations; and
   a noise-based spatial diversity combiner including the equalizer, the spatial diversity combiner using said scale factors for weighting representations of said receiver chain signals for providing said equalized signal as a composite equalized signal.

6. The receiver of claim 5, wherein:
   the noise-based spatial diversity combiner includes the equalizer for determining said composite equalized signal based upon a sum of weighted equalizer branch metrics corresponding to said receiver chain signals, respectively, said weighted equalizer branch metrics having weightings corresponding to said noise-based scale factors.

7. The receiver of claim 5, wherein:
   said noise-based scale factors include two or more prescale factors corresponding to said two or more receiver chain signals, respectively; and
   the spatial diversity combiner includes two or more noise prescalers for pre-scaling said receiver chain signals with said corresponding prescale factors for providing prescaled receiver chain signals, respectively; and the equalizer for equalizing said prescaled receiver chain signals for providing said composite equalized signal.

8. The receiver of claim 7, wherein:
   the receiver chains further include channel estimators for determining two or more sets of channel impulse response coefficients corresponding to said two of more receiver chain signals, respectively;
   the noise prescalers include transmission channel prescalers, respectively, for pre-scaling said impulse response coefficients with the corresponding prescale factors for providing corresponding prescaled impulse response coefficients; and
   the equalizer equalizes said prescaled receiver chain signals with said corresponding prescaled impulse response coefficients for providing said composite equalized signal.

9. The receiver of claim 7, wherein:
   a first of said prescale factors corresponding to a first of said receiver chain signals depends inversely upon a first of said noise representations corresponding to said first receiver chain signal.

10. The receiver of claim 9, wherein:
    the noise comparator determines a smallest of said noise representations; and
    said first prescale factor depends directly upon said smallest noise representation.

11. The receiver of claim 7, wherein:
    a first of said prescale factors corresponding to a first of said receiver chain signals depends directly upon a product of all of said noise representations except a first of said noise representations, said first noise representation corresponding to said first receiver chain signal.

12. The receiver of claim 11, wherein:

the noise comparator determines a largest of said noise representations; and said first prescale factor depends inversely upon said largest noise representation.

13. The receiver of claim 5, wherein:

said noise-based scale factors include said time-varying postscale factor dependent inversely on a square of a smallest of said noise representations; and the postscaler post-scales said composite equalized signal by said postscale factor.

14. The receiver of claim 5, wherein:

said noise-based scale factors include said postscale factor dependent directly on a square of a largest of said noise representations; and the postscaler post-scales said composite equalized signal by said postacale factor.

15. A method for receiving an incoming signal having temporal diversity, comprising:

determining one or more time-varying noise representations for noise level of said incoming signal;

calculating a time-varying postscale factor based upon said noise representations;

equalizing said incoming signal for providing a soft equalized signal;

post-scaling said equalized signal using said postscale factor for providing a noise-scaled equalized signal; and wherein:

said postscale factor depends inversely on said time-varying noise representation.

16. A method for receiving an incoming signal having temporal diversity, comprising:

determining one or more time-varying noise representations for noise level of said incoming signal;

calculating a time-varying postscale factor based upon said noise representations;

equalizing said incoming signal for providing a soft equalized signal;

post-scaling said equalized signal using said postscale factor for providing a noise-scaled equalized signal; and wherein:

said time-varying postscale factor has levels corresponding to time periods, respectively, of said incoming signal; and the step of post-scaling includes scaling said equalized signal corresponding to said time periods by said postscale factor levels corresponding to said time periods for providing said noise-scaled equalized signal.

17. The method of claim 16, wherein:

said time periods correspond to packets, respectively.

18. The method of claim 16, further comprising:

reordering a sequence of bit probabilities in said noise-scaled equalized signal according to a system interleaving specification; and determining information bits from said reordered bit probabilities according to said system coding specification.

19. A method for receiving an incoming signal having temporal diversity, comprising:

determining two or more time-varying noise representations for noise level of said incoming signal;

calculating a time-varying postscale factor based upon said noise representations;

equalizing said incoming signal for providing a soft equalized signal;

post-scaling said equalized signal using said postscale factor for providing a noise-scaled equalized signal;

receiving said incoming signal with two or more receiver chains for providing two or more receiver chain signals, respectively;

determining said noise representations from said receiver chain signals, respectively;

determining two or more noise-based scale factors from said noise representations; and wherein the step of equalizing said incoming signal includes:

determining a composite equalized signal for said equalized signal using said scale factors for weighting representations of said receiver chain signals.

20. The method of claim 19, wherein:

the step of determining a composite equalized signal includes determining said composite equalized signal based upon a sum of weighted equalizer branch metrics corresponding to said receiver chain signals, respectively, said weighted equalizer branch metrics having weightings corresponding to said noise-based scale factors.

21. The method of claim 19, wherein:

said noise-based scale factors include two or more noise-based prescale factors corresponding to said two or more receiver chain signals, respectively; and the step of determining a composite equalized signal includes steps of pre-scaling said receiver chain signals with said corresponding prescale factors for providing prescaled receiver chain signals, respectively; and the step of equalizing said incoming signal includes equalizing said prescaled receiver chain signals for providing said composite equalized signal.

22. The method of claim 21, wherein:

said step of equalizing said prescaled receiver chain signals includes determining two or more sets of channel impulse response coefficients corresponding to said two or more receiver chain signals, respectively; pre-scaling said impulse response coefficients with the corresponding prescale factors for providing corresponding prescaled impulse response coefficients; and equalizing said prescaled receiver chain signals with said corresponding prescaled impulse response coefficients for providing said composite equalized signal.

23. The method of claim 21, wherein:

a first of said prescale factors corresponding to a first of said receiver chain signals depends inversely upon a first of said noise representations corresponding to said first receiver chain signal.

24. The method of claim 23, further comprising:

determining a smallest of said noise representations; and wherein:

said first prescale factor depends directly upon said smallest noise representation.

25. The method of claim 21, wherein:

a first of said prescale factors corresponding to a first of said receiver chain signals depends directly upon a product of all of said noise representations except a first of said noise representations, said first noise representation corresponding to said first receiver chain signal.

26. The method of claim 25, further comprising:

determining a largest of said noise representations; and wherein:

said first prescale factor depends inversely upon said largest noise representation.

27. The method of claim 19, wherein:

said noise-based scale factors include said postscale factor dependent inversely on a square of a smallest of said noise representations; and the step of post-scaling said equalized signal includes post-scaling said composite equalized signal by said postscale factor.

28. The method of claim 19, wherein:

said noise-based scale factors include said postscale factor dependent directly on a square of a largest of said noise representations; and the step of post-scaling said equalized signal includes post-scaling said composite equalized signal by said postscale factor.

* * * * *